(12) United States Patent
Boisson et al.

(10) Patent No.: US 8,039,565 B2
(45) Date of Patent: Oct. 18, 2011

(54) CATALYTIC SYSTEM FOR OBTAINING CONJUGATED DIENE/MONO-OLEFIN COPOLYMERS AND THESE COPOLYMERS

(75) Inventors: Christophe Boisson, Tramoyes (FR); Vincent Monteil, Lyons (FR); Roger Spitz, Lyons (FR)

(73) Assignees: Michelin Recherche et Technique S.A., Granges-Paccot (CH); Total Petrochemicals Research-Feluy, Senefe (BE)

( * ) Notice: Subject to any disclaimer, the term of this patent is extended or adjusted under 35 U.S.C. 154(b) by 0 days.

(21) Appl. No.: 12/453,333

(22) Filed: May 7, 2009

(65) Prior Publication Data

US 2009/0270578 A1 Oct. 29, 2009

Related U.S. Application Data

(60) Division of application No. 11/350,754, filed on Feb. 10, 2006, now Pat. No. 7,547,654, which is a continuation of application No. PCT/EP2004/008336, filed on Jul. 26, 2004.

(30) Foreign Application Priority Data

Aug. 13, 2003 (FR) ..................... 03 09930

(51) Int. Cl.
C08F 4/52 (2006.01)
C08F 236/04 (2006.01)
C08F 236/06 (2006.01)
B01J 31/22 (2006.01)

(52) U.S. Cl. .................. 526/164; 526/339; 526/943

(58) Field of Classification Search .................. 526/164, 526/339, 943
See application file for complete search history.

(56) References Cited

U.S. PATENT DOCUMENTS

| | | | | |
|---|---|---|---|---|
| 3,898,207 A | * | 8/1975 | Halasa et al. | ................. 526/152 |
| 6,310,164 B1 | | 10/2001 | Morizono et al. | |
| 6,348,555 B1 | | 2/2002 | Lai et al. | |
| 6,569,799 B1 | | 5/2003 | Barbotin et al. | |

FOREIGN PATENT DOCUMENTS

| | | |
|---|---|---|
| EP | 0 891 993 A1 | 1/1999 |
| EP | 1 092 731 A1 | 4/2001 |

* cited by examiner

*Primary Examiner* — Caixia Lu
(74) *Attorney, Agent, or Firm* — Buchanan, Ingersoll & Rooney PC

(57) ABSTRACT

A catalytic system usable for the copolymerization of at least one conjugated diene and at least one monoolefin, a process for preparing this catalytic system, a process for preparing a copolymer of a conjugated diene and at least one monoolefin using said catalytic system, and said copolymer are described. This catalytic system includes:

(i) an organometallic complex represented by the following formula:

$$\{[P(Cp)(Fl)Ln(X)(L_X)\}_p \quad (1)$$

where Ln represents a lanthanide atom to which is attached a ligand molecule comprising cyclopentadienyl Cp and fluorenyl Fl groups linked to one another by a bridge P of the formula $MR^1R^2$, M is an element from column IVa of Mendeleev's periodic table and $R^1$ and $R^2$ each represent alkyl groups of 1 to 20 carbon atoms or cycloalkyl or phenyl groups of 6 to 20 carbon atoms, X represents a halogen atom, L represents an optional complexing molecule, such as an ether, and optionally a substantially less complexing molecule, such as toluene, p is a natural integer greater than or equal to 1 and x is greater than or equal to 0, and (ii) a co-catalyst selected from alkylmagnesiums, alkyllithiums, alkylaluminums, Grignard reagents and mixtures of these constituents.

4 Claims, No Drawings

CATALYTIC SYSTEM FOR OBTAINING CONJUGATED DIENE/MONO-OLEFIN COPOLYMERS AND THESE COPOLYMERS

CROSS-REFERENCE TO RELATED APPLICATIONS

This application is a divisional of application Ser. No. 11/350,754, filed Feb. 10, 2006 now U.S. Pat. No. 7,547,654, which is a continuation of International Application No. PCT/EP2004/008336, filed Jul. 26, 2004, published in French as WO 2005/028526 on Mar. 31, 2005, which, in turn, claims priority to French Application No. 03/09930, filed Aug. 13, 2003, the disclosures of each of these applications being incorporated herein by reference in their entirety.

BACKGROUND

1. Field of the Invention

The present invention relates to a catalytic system usable for the copolymerization of at least one conjugated diene and at least one monoolefin, to a process for preparing this catalytic system, to a process for preparing a copolymer of at least one conjugated diene and at least one monoolefin involving the use of said catalytic system, and to such a copolymer. The invention applies in particular to the copolymerization of a conjugated diene with an alpha-olefin and/or ethylene.

2. Description of Related Art

It has long been difficult to carry out the copolymerization of a conjugated diene and a monoolefin, such as an alpha-olefin (i.e. comprising by definition at least three carbon atoms, unlike ethylene which is not an alpha-olefin), due to the different coordination indices exhibited by conjugated dienes and monoolefins with regard to Ziegler Natta type catalytic systems based on transition metals.

It has been known since the 1970s to prepare alternating copolymers of a conjugated diene, such as butadiene or isoprene, and an alpha-olefin, such as propylene, by means of such catalytic systems based on vanadium or titanium. Reference will be made, for example, to the article "Furukawa, J. in Alternating Copolymers, Cowie, J. M. G., ed.; Plenum Press: New York, 1985; pp. 153-187" which mentions the use of a catalytic system based on a derivative of vanadium and an aluminum compound for obtaining these copolymers.

One major disadvantage of these catalytic systems is that they must be prepared at very low temperatures (approximately −70° C.) and that they entail the use of a likewise low copolymerization temperature, being between −30° C. and −50° C. Using higher temperatures for the copolymerization results in deactivation of these catalytic systems and in a reduction in the molecular masses of the copolymers obtained.

In order to obtain alternating copolymers of butadiene and propylene exhibiting higher molecular masses with improved activity and greater control of the degree of alternation, German patent specification DE-A-270 6118 teaches the use of catalytic system comprising a vanadium dialkoxyhalide and a trialkylaluminum.

One major disadvantage of these catalytic systems based on vanadium is again that copolymerization must be carried out at low temperature.

Non-alternating conjugated diene/alpha-olefin copolymers, such as butadiene/propylene or butadiene/ethylene/propylene copolymers, have also been produced in the past, the copolymerization reactions being performed at temperatures higher than ambient temperature. To this end, use has been made either of homogeneous catalytic systems based on a halogenated trialkylaluminum and a vanadium derivative (see German patent specifications DE-A-253 4496 and DE-A-20O 1367 which relate to obtaining butadiene/ethylene/propylene terpolymers with a reduced content of trans-1,4 butadiene units) or of a derivative of titanium and phosgene (see the article "Furukawa, J. et al., J. Polym. Sci., Polym. Chem. Ed. 1973, 11, p. 629" which relates to obtaining random copolymers), or of catalytic systems based on $TiCl_4$ supported on a magnesium halide (see European patent specification EP-A-171 025).

It will be noted that these latter supported catalytic systems have the twin drawback of giving rise, on the one hand, to the formation of a gel in the resultant copolymers and, on the other hand, to reduced molar contents of inserted butadiene, typically of less than 15%.

The attempt has also been made to prepare butadiene/ethylene/propylene terpolymers by means of homogeneous catalytic systems comprising conventional metallocenes of group IV of the periodic table which satisfy the formula $Cp_2MX_2$ (see international patent specification WO-A-88/04672 and the article "Galimberti et al., Makromol. Chem. 1991, 192, p. 2591").

One major disadvantage of these catalytic systems of the formula $Cp_2MX_2$ is that the butadiene considerably limits activity and is inserted in only very small quantities. It will be noted that the copolymers obtained in this manner comprise cyclic units (cyclopentane units).

European patent specification EP-A-891 993 proposes a catalytic system for the copolymerization of a monoolefin having 2 to 12 carbon atoms and at least one conjugated diene monomer, which system comprises constituent (a) below and at least one compound selected from among constituents (b), (c) and (d) below:

(a) a transition metal complex satisfying any one of the following formulae:

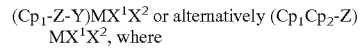

$(Cp_1\text{-}Z\text{-}Y)MX^1X^2$ or alternatively $(Cp_1Cp_2\text{-}Z)MX^1X^2$, where M is any one of the following metals: Ti, Zr, Hf, Rn, Nd, Sm, Ru, $Cp_1$ and $Cp_2$ are each a cyclopentadienyl, indenyl or fluorenyl group, Y is a ligand containing an atom of oxygen, nitrogen, phosphorus or sulfur, Z represents C, O, B, S, Ge, Si, Sn or a group containing any one of these atoms, $X^1$ and $X^2$ each represent an anionic or neutral ligand which is a Lewis base;

(b) a compound which reacts with the metal M of (a) to form an ionic complex;

(c) an organoaluminum compound; and (d) an aluminoxane.

It will be noted that the copolymers obtained in this document EP-A-891 993 comprise a low molar content of inserted conjugated diene (less than 10%) and that they always comprise cyclic units (of the cyclopentane and cyclopropane type).

Catalytic systems specifically comprising a lanthanide complex and enabling the copolymerization of conjugated dienes and alpha-olefins have also been reported in the literature. Kaulbach et al. have described the copolymerization of butadiene/octene or dodecene with a neodymium octoate complex in Angew. Makromol. Chem. 1995, 226, p. 101. Visseaux M. et al have described the copolymerization of alpha-olefin/conjugated diene (butadiene or isoprene) with a lanthanide allyl complex in Macromol. Chem. Phys. 2001, 202, p. 2485.

One major disadvantage of these latter catalytic systems is that the molar content of inserted alpha-olefin is always low, being less than 20%.

It is furthermore known to copolymerise ethylene and a conjugated diene, such as butadiene, by means of halogenated lanthanide complexes which can be alkylated in situ in the polymerization medium via a co-catalyst. Accordingly, European patent specification EP-A-1 092 731 in the name of the present applicants teaches the use to this end of a catalytic system comprising:

on the one hand, an organometallic complex represented by one of the following formulae:

A':

B':

where Ln represents a lanthanide metal having an atomic number which may range from 57 to 71, where X represents a halogen which may be chlorine, fluorine, bromine or iodine, where, in the formula A', two ligand molecules $Cp_1$ and $Cp_2$, each consisting of a substituted or unsubstituted cyclopentadienyl or fluorenyl group, are attached to the metal Ln, where, in the formula B', a ligand molecule consisting of two substituted or unsubstituted cyclopentadienyl or fluorenyl groups $Cp_1$ and $Cp_2$ linked to one another by a bridge P of the formula $MR_2$, where M is an element from column IVa of Mendeleev's periodic table, and where R is an alkyl group comprising from 1 to 20 carbon atoms, is attached to the metal Ln and on the other hand, a co-catalyst selected from the group comprising an alkylmagnesium, an alkyllithium, an alkylaluminum, a Grignard reagent and a mixture of these constituents.

SUMMARY OF THE INVENTION

The object of the present invention is to propose a novel catalytic system which remedies the above-stated drawbacks, and this object is achieved in that the applicants have surprisingly discovered that a catalytic system comprising:

(i) an organometallic complex represented by the following generic formula:

$$\{[P(Cp)(Fl)Ln(X)(L_x)]\}_p \quad (1)$$

where Ln represents a lanthanide atom of an atomic number from 57 to 71, to which is attached a ligand molecule comprising cyclopentadienyl Cp and fluorenyl Fl groups which are each independently substituted or unsubstituted and linked to one another by a bridge P of the formula $MR^1R^2$, where M is an element from column IVa of Mendeleev's periodic table and where $R^1$ and $R^2$, which may be identical or different, each represent alkyl groups having from 1 to 20 carbon atoms or alternatively cycloalkyl or phenyl groups having from 6 to 20 carbon atoms, where X represents a halogen atom which may be chlorine, fluorine, bromine or iodine, where L comprises an optional complexing molecule, such as an ether, and optionally a substantially less complexing molecule, such as toluene, where p is a natural integer greater than or equal to 1 and x is greater than or equal to 0, and (ii) a co-catalyst belonging to the group consisting of alkylmagnesiums, alkyllithiums, alkylaluminums, Grignard reagents and mixtures of these constituents, may be used to obtain a copolymer of a conjugated diene and at least one monoolefin, such as an alpha-olefin and/or ethylene, and more particularly a copolymer of at least one conjugated diene and at least one alpha-olefin having from 3 to 18 carbon atoms, said copolymer having a number-average molecular mass which may be greater than 30000 g/mol, or even than 60000 g/mol, and comprising units resulting from said conjugated diene(s) in a molar content of greater than 40% and units resulting from said alpha-olefin(s) in a molar content of greater than or equal to 10%.

DETAILED DESCRIPTION OF THE INVENTION

It will be noted that said organometallic complex may be activated in situ in the polymerization medium via said co-catalyst, which has the twin function of creating a metal-carbon bond and of purifying the polymerization medium.

Said organometallic complex is, for example, represented by the following formula:

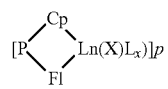 (1a)

According to one embodiment of the invention, said organometallic complex is such that p equals 2, in which case it is a dimer represented by the following formula:

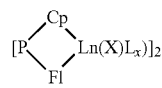

Likewise preferably, said cyclopentadienyl Cp and fluorenyl Fl groups are both unsubstituted in either of the above-stated formulae, respectively satisfying the formulae $C_5H_4$ and $C_{13}H_8$.

Likewise preferably in relation to any one of the above-stated features according to the invention, said bridge P satisfies the formula $SiR^1R^2$. Still more preferably, $R^1$ and $R^2$ are each independently alkyl groups, such as methyl groups.

Likewise preferably in relation to any one of the above-stated features according to the invention, said organometallic complex is such that the lanthanide Ln is neodymium.

Likewise preferably in relation to any one of the above-stated features according to the invention, said co-catalyst is an alkylmagnesium such as butyloctylmagnesium, or a mixture of an alkylaluminum such as diisobutylaluminum hydride and an alkyllithium such as butyllithium which are present in this mixture in substantially stoichiometric quantities.

Likewise preferably in relation to any one of the above-stated features according to the invention, the (co-catalyst/organometallic complex) molar ratio is less than or equal to 5, such that said resultant copolymer may have a number-average molecular mass Mn of greater than 30,000 g/mol.

Still more preferably, said (co-catalyst/organometallic complex) molar ratio is less than or equal to 2, such that said resultant copolymer may have a number-average molecular mass Mn of greater than 60,000 g/mol.

A process for preparation according to the invention of said catalytic system comprises:
  a) preparation of said organometallic complex comprising:
    (i) reaction with an alkyllithium of a hydrogenated ligand molecule, represented by formula (2) below, in order to obtain a lithium salt satisfying the formula (3) below:

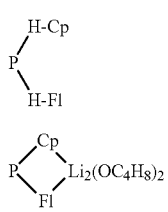

(2)

(3)

(ii) reaction in a complexing solvent of said salt with an anhydrous trihalide of said lanthanide of the formula $LnX_3$ where X is said halogen,
  (iii) evaporation of said complexing solvent, then extraction of the product obtained in (ii) in a solvent which is substantially less complexing than the solvent used in (ii), then, optionally,
  (iv) crystallization of the product extracted in (iii) in order to obtain said organometallic complex from which said complexing solvent is completely absent, then
  b) addition of said co-catalyst to said organometallic complex prepared in a).

Preferably, at least one of the following conditions prevails:
  said alkyllithium used in a) (i) is butyllithium, and/or
  said complexing solvent used in a) (ii) is tetrahydrofuran, and/or
  said substantially less complexing solvent used in a) (iii) is heptane (virtually non-complexing) or toluene ("moderately" complexing).

Preferably, this process is such that said cyclopentadienyl Cp and fluorenyl Fl groups are both unsubstituted, respectively satisfying the formulae $C_5H_4$ and $C_{13}H_8$.

Likewise preferably in relation to any one of the above-stated features, this process is such that said bridge P satisfies the formula $SiR^1R^2$.

Still more preferably, this process is such that $R^1$ and $R^2$ are each independently alkyl groups, such as methyl groups.

Likewise preferably in relation to any one of the above-stated features, this process is such that said lanthanide Ln is neodymium.

Likewise preferably in relation to any one of the above-stated features, this process is such that said co-catalyst is an alkylmagnesium such as butyloctylmagnesium, or a mixture of an alkylaluminum such as diisobutylaluminum hydride and an alkyllithium such as butyllithium, which are present in said mixture in substantially stoichiometric quantities.

Likewise preferably in relation to any one of the above-stated features, this process is such that the molar ratio (number of moles of said co-catalyst/number of moles of said organometallic complex) is less than or equal to 5, the catalytic system being usable such that the copolymer has a molecular mass Mn of greater than 30,000 g/mol.

Still more preferably, this process is such that said (co-catalyst/organometallic complex) molar ratio is less than or equal to 2, the catalytic system being usable such that copolymer has a molecular mass Mn of greater than 60,000 g/mol.

A process according to the invention for preparing a copolymer of at least one conjugated diene and at least one monoolefin comprises the reaction of said catalytic system as defined previously in an inert hydrocarbon solvent, in the presence of said conjugated diene(s) and said monoolefin(s).

Preferably, this process is such that said copolymer comprises units resulting from a conjugated diene, such as butadiene or isoprene, and units resulting from at least one monoolefin belonging to the group consisting of ethylene, alpha-olefins and vinyl aromatic compounds.

Advantageously, in relation to any one of the above-stated features, this process is such that said copolymer comprises units resulting from an alpha-olefin having from 3 to 18 carbon atoms in a molar content of greater than or equal to 10%, or alternatively that it comprises units resulting from ethylene and, in a molar content of greater than or equal to 10%, units resulting from an alpha-olefin having from 3 to 18 carbon atoms.

In either of the latter two cases, this process is advantageously such that the units resulting from said conjugated diene are present in said copolymer in a molar content of greater than 40%, preferably of greater than 50%.

Advantageously, in relation to any one of the above-stated features, this process is such that the units resulting from said conjugated diene(s) have a trans-1,4 linkage content of greater than 70%.

Advantageously, in relation to any one of the above-stated features, this process is such that the (co-catalyst/organometallic complex) molar ratio is less than or equal to 5, such that the molecular mass Mn of the copolymer is greater than 30,000 g/mol.

Still more advantageously, this process is such that said (co-catalyst/organometallic complex) molar ratio is less than or equal to 2, such that said copolymer has a molecular mass Mn of greater than 60,000 g/mol.

A copolymer of at least one conjugated diene and at least one alpha-olefin having from 3 to 18 carbon atoms according to the invention is capable of being obtained by a copolymerization process as defined previously, and this copolymer according to the invention is preferably such that it simultaneously fulfils the following conditions:
  the number-average molecular mass of said copolymer is greater than 60,000 g/mol,
  said copolymer comprises units resulting from said conjugated diene(s) in a molar content of greater than 40% and less than or equal to 90%, and units resulting from said alpha-olefin(s) in a molar content of less than 60% and greater than or equal to 10%,
  said units resulting from said conjugated diene(s) have a trans-1,4 linkage content of greater than 70%, and
  said copolymer is devoid of cyclic units.

According to an advantageous embodiment of the invention in relation to either one of the above-stated two features, said copolymer consists of a copolymer of a conjugated diene, such as butadiene or isoprene, and an alpha-olefin having from 3 to 18 carbon atoms, such as propene, butene, hexene or octene.

Still more preferably, said copolymer according to the invention comprises the units resulting from said conjugated diene(s) in a molar content of greater than 60% and less than or equal to 80%, and the units resulting from said alpha-olefin(s) in a molar content of less than 40% and greater than or equal to 20%.

According to an advantageous variant of the invention, said copolymer is consists of a terpolymer of a conjugated diene, such as butadiene or isoprene, of ethylene and of an alpha-olefin of 3 to 18 carbon atoms, such as propene, butene, hexene or octene.

According to another feature of the invention, said copolymer is such that each unit resulting from said alpha-olefin(s) is inserted in the chain of said copolymer between two units resulting from said or each conjugated diene, such that the overall set of the units of said copolymer exhibits a regular distribution of the practically alternating kind (also known as "pseudo-alternating" by the person skilled in the art).

The above-stated features of the present invention, as well as others, will be better understood on reading the following description of several embodiments of the invention, which are given by way of non-limiting illustration, in comparison with two final comparative examples illustrating the prior art.

All the following Examples were performed under argon and the solvents were previously dried with a 3 Å molecular sieve under a stream of argon. The liquid alpha-olefins together with the styrene were dried over $CaH_2$ or NaH and then distilled.

The microstructure of the copolymers obtained in these Examples was determined using $^1H$ NMR and $^{13}C$ NMR techniques. A "BRUKER DRX 400" spectrometer was used for this purpose at a frequency of 400 MHz for the $^1H$ NMR and of 100.6 MHz for the $^{13}C$ NMR. Reference will be made to the attached appendix for a description of these methods.

Glass transition temperatures were measured by DSC (Differential Scanning Calorimetry) using a "Setaram DSC 131" apparatus. The temperature program used corresponds to a rise in temperature from −120° C. to 150° C. at a rate of 10° C./min.

The molecular masses Mn and Mw (average molecular masses in number and weight) and polydispersity indices (Ip=Mw/Mn) were determined by size-exclusion chromatography using the apparatus and under the analytical conditions described below. The molecular masses values stated in the following Examples are stated as polystyrene equivalents.

Apparatus: Waters, 515 HPLC (pump) and IR 410 (detector).

Columns: 1 "Waters Styragel HR 4E" column+2 "Waters Styragel HR 5E" columns.

Temperature: T(column)=45° C., T(detector)=40° C.
Solvent: THF.
Elution rate: 1 ml/min.
Standards: Polystyrene (Mn: 580 to 3,150,000 g/mol).

EXAMPLE 1

Synthesis of the Organometallic Complex $[Me_2Si(C_5H_4)(C_{13}H_8)]NdCl(OC_4H_8)_x$ Synthesis of the Ligand $Me_2Si(C_5H_5)(C_{13}H_9)$ The ligand $Me_2Si(C_5H_4)(C_{13}H_9)$, where Me denotes a methyl group, was synthesized according to an operating method described in the literature (Alt et al *J. Organomet. Chem.* 1996, 509, pp. 63-71).

Synthesis of the salt $[Me_2Si(C_5H_4)(C_{13}H_8)]Li_2(OC_4H_8)_2$ 12.1 ml of 1.6 M BuLi are added at ambient temperature to a solution of 2.8 g of the ligand $Me_2Si(C_5H_5)(C_{13}H_9)$ in 150 ml of THF. The solution is stirred for 4 h, then the THF is evaporated. The residue is dried in a vacuum then washed while cold with two 50 ml portions of heptane. A yellow solid is isolated. $^1H$ NMR analysis of this solid was performed with a "BRUKER 300 MHz" spectrometer in the range THF-d8: δ(chemical shift in ppm)=

7.85 (d, J 8 Hz, 2H, Fl),
7.77 (d, J 8 Hz, 2H, Fl),
6.79 (dd, J 8 Hz and 7 Hz, 2H, Fl),
6.44 (dd, J 8 Hz and 7 Hz, 2H, Fl),
6.15 (m, 2H, Cp),
5.83 (m, 2H, Cp),
3.62 (THF),
1.78 (THF),
0.67 (s, 6H, $SiMe_2$).

The structure of the salt obtained is $[Me_2Si(C_5H_4)(C_{13}H_8)]Li_2(OC_4H_8)_2$.

Synthesis of the Organometallic Complex $[Me_2Si(C_5H_4)(C_{13}H_8)]NdCl(OC_4H_8)_x$ 0.58 g (2.3 mmol) of $NdCl_3$ are stirred overnight while being refluxed in 50 ml of THF. A solution of 0.82 g of the salt $[Me_2Si(C_5H_4)(C_{13}H_8)]Li_2(OC_4H_8)_2$ in 50 ml of THF is added at −20° C. to the resultant suspension. The solution formed is then stirred for 24 h at ambient temperature. The THF is evaporated and the residue is taken up in toluene. The salt (LiCl) is filtered out and the organometallic complex of the formula $[Me_2Si(C_5H_4)(C_{13}H_8)]NdCl(OC_4H_8)_x$ is recovered by evaporation of the toluene.

EXAMPLE 2

Copolymerization of Butadiene and Ethylene by Means of the Organometallic Complex of Example 1 and Various Co-catalysts Three tests according to the invention of the copolymerization of ethylene and butadiene were performed according to the operating method described below, together with a "control" test of the homopolymerization of ethylene.

A solution composed of 300 ml of toluene, a specific quantity $x_c$ (mg) of the organometallic complex of the formula $[Me_2Si(C_5H_4)(C_{13}H_8)]NdCl(OC_4H_8)_x$ prepared in Example 1 and of a co-catalyst according to the invention and then a mixture of ethylene and butadiene with a molar fraction y (%) of butadiene were introduced in succession into a reactor under an argon atmosphere. The internal pressure of the reactor was maintained at 4 bar when the fraction y of butadiene so permits. The temperature of the polymerization reactor was maintained at 80° C. for the polymerization.

After a reaction time t (min.), polymerization is terminated by cooling and degassing the reactor, then the copolymer is obtained by precipitation in methanol. After drying, a mass m (g) of copolymer comprising units resulting from butadiene according to a molar fraction z (%) is obtained.

The co-catalyst used was butyloctylmagnesium (hereinafter abbreviated to "BOMAG") or a mixture of butyllithium ("BuLi") and diisobutylaluminum hydride ("DiBAH") with the following molar proportions:

neodymium/BuLi/DiBAH=1/10/10, and neodymium/BOMAG=1/20

(i.e. 20 molar equivalents of co-catalyst relative to the neodymium).

The four polymerization tests are described in Table 1 below.

TABLE 1

| Tests | $x_c$ (mg) | Co-catalyst | m (g) | t (min) | y (%) | z (%) | Butadiene insertion (molar content) % 1,2 | % trans-1,4 |
|---|---|---|---|---|---|---|---|---|
| 2-1 | 34 | BuLi/DiBAH | 3.4 | 70 | — | — | — | — |
| 2-2 | 45 | BuLi/DiBAH | 4.2 | 50 | 20 | 28 | 4 | 96 |
| 2-3 | 40 | BuLi/DiBAH | 5.0 | 120 | 40 | 48 | 4 | 96 |
| 2-4 | 30 | BOMAG | 6.5 | 60 | 20 | 26 | 3 | 97 |

These results show that the ethylene/butadiene copolymers obtained in tests 2-2 to 2-4 comprise units resulting from butadiene according to a molar fraction z of greater than 20%, and that the molar content of trans-1,4 units for these units resulting from butadiene is greater than 90%.

EXAMPLES 3

Copolymerization of Butadiene and Octene by Means of the Organometallic Complex of Example 1 and Various Co-catalysts

EXAMPLE 3-1

A solution composed of 10 ml of toluene, 100 ml of octene, 35 mg of said complex prepared in Example 1 and 20 molar equivalents relative to the neodymium of a co-catalyst consisting of a "BuLi/DiBAH" mixture, with neodymium/BuLi/DiBAH=1/10/10, and then 25 ml of butadiene were introduced in succession into a reactor under an argon atmosphere. The temperature of the polymerization reactor was adjusted to 80° C.

After a reaction time of 7.5 h, polymerization was terminated by cooling and degassing the reactor, then the copolymer was obtained by precipitation in methanol. After drying at reduced pressure at 70° C., the yield was 11.4 g. The molecular mass Mn of the polymer was 11470 g/mol (Ip index=1.7). The glass transition temperature was −71.5° C. Analysis of the copolymer by $^{13}$C and $^1$H NMR was as follows (molar contents):

octene=32.0 mol % and butadiene=68.0%, with:
1,2-butadiene=7.0% and 1,4-butadiene=93.0%, 96.0% of which was trans-1,4.

EXAMPLE 3-2

A solution composed of 10 ml of toluene, 100 ml of octene, 37 mg of said complex prepared in Example 1 and 20 molar equivalents relative to the neodymium of a "BOMAG" co-catalyst, and then 25 ml of butadiene were introduced in succession into a reactor under an argon atmosphere. The temperature of the polymerization reactor was adjusted to 80° C.

After a reaction time of 15 h, polymerization was terminated by cooling and degassing the reactor, then the copolymer was obtained by precipitation in methanol. After drying at reduced pressure at 70° C., the yield was 13.3 g. The molecular mass Mn of the polymer was 8960 g/mol (Ip index=1.8). The glass transition temperature was −65.4° C. Analysis of the copolymer by $^{13}$C and $^1$H NMR was as follows (molar contents):

octene=29.4% and butadiene=70.6%, with:
1,2-butadiene=16.3% and 1,4-butadiene=83.7%, 97.5% of which was trans-1,4.

EXAMPLE 3-3

A solution composed of 10 ml of toluene, 100 ml of octene, 37 mg of said complex prepared in Example 1 and 5 molar equivalents relative to the neodymium of a "BOMAG" co-catalyst, and then 25 ml of butadiene were introduced in succession into a reactor under an argon atmosphere. The temperature of the polymerization reactor was adjusted to 80° C.

After a reaction time of 15 h, polymerization was terminated by cooling and degassing the reactor, then the copolymer was obtained by precipitation in methanol. After drying at reduced pressure at 70° C., the yield was 13.1 g. The molecular mass Mn of the copolymer was 30650 g/mol (Ip index=2.3). The glass transition temperature was −69.0° C. Analysis of the copolymer by $^{13}$C and $^1$H NMR was as follows (molar contents):

octene=28.8% and butadiene=71.2%, with:
1,2-butadiene=10.3% and 1,4-butadiene=89.7%, 96.6% of which was trans-1,4.

EXAMPLE 3-4

A solution composed of 10 ml of toluene, 100 ml of octene, 33 mg of said complex prepared in Example 1 and 2 molar equivalents relative to the neodymium of a "BOMAG" co-catalyst, and then 25 ml of butadiene were introduced in succession into a reactor under an argon atmosphere. The temperature of the polymerization reactor was adjusted to 80° C.

After a reaction time of 15 h, polymerization was terminated by cooling and degassing the reactor, then the copolymer was obtained by precipitation in methanol. After drying at reduced pressure at 70° C., the yield was 6.8 g. The molecular mass Mn of the copolymer was 67350 g/mol (Ip index=1.9). The glass transition temperature was −69.6° C. Analysis of the copolymer by $^{13}$C and $^1$H NMR was as follows (molar contents):

octene=26.2% and butadiene=73.8%, with:
1,2-butadiene=10.1% and 1,4-butadiene=89.9%, 93.8% of which was trans-1,4.

EXAMPLE 3-5

A solution composed of 200 ml of toluene, 50 ml of octene, 30 mg of said complex prepared in Example 1 and 20 molar equivalents relative to the neodymium of a "BOMAG" co-catalyst, and then 30 ml of butadiene were introduced in succession into a reactor under an argon atmosphere. The temperature of the polymerization reactor was adjusted to 80° C.

After a reaction time of 22 h, polymerization was terminated by cooling and degassing the reactor, then the copolymer was obtained by precipitation in methanol. After drying at reduced pressure at 70° C., the yield was 7.6 g. The molecular mass Mn of the copolymer was 7120 g/mol (Ip index=2.0). The glass transition temperature was −64° C. Analysis of the copolymer by $^{13}$C and $^1$H NMR was as follows (molar contents):

octene=13.7% and butadiene=86.3%, with:
1,2-butadiene=24.7% and 1,4-butadiene=75.3%, 95.2% of which was trans-1,4.

The results obtained from these tests 3-1 to 3-5 show that the copolymers obtained have a molar content of units resulting from octene which is between 10 and 60% and a molar content of units resulting from butadiene which is between 90 and 40%.

It will be noted that the units of these copolymers which result from butadiene have a molar content of trans-1,4 units which is always greater than 70%.

It will furthermore be noted that tests 3-3 and 3-4 advantageously give rise to octene/butadiene copolymers of a relatively high molecular mass Mn (greater than 30000 and 60000 g/mol respectively), due to the very low (co-catalyst/organometallic complex) molar ratio which was used (ratio equal to 5 and to 2 for these tests 3-3 and 3-4, respectively).

EXAMPLE 4

Copolymerization of Butadiene and Hexene by Means of the Organometallic Complex of Example 1 and a Co-catalyst A solution composed of 10 ml of toluene, 100 ml of hexene, 39 mg of said complex prepared in Example 1 and 20 molar equivalents relative to the neodymium of a co-catalyst consisting of a "BuLi/DiBAH" mixture, with neodymium/BuLi/DiBAH=1/10/10, and then 25 ml of butadiene were introduced in succession into a reactor under an argon atmosphere. The temperature of the polymerization reactor was adjusted to 80° C.

After a reaction time of 17 h, polymerization was terminated by cooling and degassing the reactor, then the copolymer was obtained by precipitation in methanol. After drying at reduced pressure at 70° C., the yield was 18.9 g. The molecular mass Mn of the polymer was 17500 g/mol (Ip index=1.9). The glass transition temperature was −68.7° C. Analysis of the copolymer by $^{13}$C and $^1$H NMR was as follows (molar contents):

hexene=29.8% and butadiene=70.2%, with:
1,2-butadiene=7.5% and 1,4-butadiene=92.5%, 95.0% of which was trans-1,4.

EXAMPLE 5

Copolymerization of Butadiene and Butene by Means of the Organometallic Complex of Example and a Co-catalyst A solution composed of 100 ml toluene, 37 mg of said complex prepared in Example 1 and 20 molar equivalents relative to the neodymium of a co-catalyst consisting of a "BuLi/DiBAH" mixture with neodymium/BuLi/DiBAH=1/10/10, and then 25 ml of butadiene and 25 ml of butene were introduced in succession into a reactor under an argon atmosphere. The temperature of the polymerization reactor was adjusted to 80° C.

After a reaction time of 18 h, polymerization was terminated by cooling and degassing the reactor, then the copolymer was obtained by precipitation in methanol. After drying at reduced pressure at 70° C., the yield was 10.7 g. The molecular mass Mn of the copolymer was 13200 g/mol (Ip index=1.9). The glass transition temperature was −74.6° C. Analysis of the copolymer by $^{13}$C and $^1$H NMR was as follows (molar contents):

butene=18.6% and butadiene=81.4%, with:
1,2-butadiene=9.6% and 1,4-butadiene=90.4%, 95.0% of which was trans-1,4.

EXAMPLE 6

Copolymerization of Butadiene and Hexadecene by Means of the Organometallic Complex of Example and a Co-catalyst A solution composed of 10 ml of toluene, 100 ml of hexadecene, 32 mg of said complex prepared in Example 1 and 20 molar equivalents relative to the neodymium of a co-catalyst consisting of a "BuLi/DiBAH" mixture, with neodymium/BuLi/DiBAH=1/10/10, and then 25 ml of butadiene were introduced in succession into a reactor under an argon atmosphere. The temperature of the polymerization reactor was adjusted to 80° C.

After a reaction time of 7 h, polymerization was terminated by cooling and degassing the reactor, then the copolymer was obtained by precipitation in methanol. After drying at reduced pressure at 70° C. and distillation of any residual hexadecene, the yield was 9.9 g. The molecular mass Mn of the copolymer was 21530 g/mol (Ip index=1.8). The glass transition temperature could not be determined due to a very wide melting range (Tf (peak summit)=−9° C.). Analysis of the copolymer by $^{13}$C and $^1$H NMR was as follows (molar contents):

hexadecene=21.8% and butadiene=78.2%, with:
1,2-butadiene=10.2% and 1,4-butadiene=89.8%, 93.8% of which was trans-1,4.

EXAMPLE 7

Copolymerization of Butadiene and Propene by Means of the Organometallic Complex of Example and a Co-catalyst A solution composed of 450 ml toluene, 25 mg of said complex prepared in Example 1 and 20 molar equivalents relative to the neodymium of a co-catalyst consisting of a "BuLi/DiBAH" mixture, with neodymium/BuLi/DiBAH=1/10/10, 30 ml of butadiene together with an appropriate quantity of propylene to achieve a total pressure P=7 bar when T=80° C. were introduced in succession into a reactor under an argon atmosphere.

After a reaction time of 15 h, polymerization was terminated by cooling and degassing the reactor, then the copolymer was obtained by precipitation in methanol. After drying at reduced pressure at 70° C., the yield was 7.3 g. The molecular mass Mn of the copolymer was 9120 g/mol (Ip=2.0). The glass transition temperature was −75.3° C. Analysis of the copolymer by $^{13}$C and $^1$H NMR was as follows (molar contents): propene=35.8% and butadiene=64.2%, and 1,2-butadiene=6.1%, 1,4-butadiene=93.9%, 97.4% of which was trans-1,4.

EXAMPLE 8

Copolymerization of Butadiene and Styrene by Means of the Organometallic Complex of Example and a Co-catalyst A solution composed of 50 ml of toluene, 50 ml of styrene, 30 mg of said complex prepared in Example 1 and 20 molar equivalents relative to the neodymium of a "BOMAG" co-catalyst, and then 25 ml of butadiene were introduced in succession into a reactor under an argon atmosphere. The temperature of the polymerization reactor was adjusted to 80° C.

After a reaction time of 14 h, polymerization was terminated by cooling and degassing the reactor, then the copolymer was obtained by precipitation in methanol. After drying at reduced pressure at 70° C., the yield was 46.4 g. The molecular mass Mn of the copolymer was 25900 g/mol (Ip index=2.0). The glass transition temperature was +16° C. Analysis of the copolymer by $^{13}C$ and $^{1}H$ NMR was as follows (molar contents):
  styrene=57% and butadiene=43%, with 1,4-butadiene=100%, of which 100% was trans-1,4.

EXAMPLE 9

Terpolymerization of Butadiene, Ethylene and Octene by Means of the Organometallic Complex of Example and a Co-catalyst A solution composed of 10 ml of toluene, 100 ml of octene, 37 mg of said complex prepared in Example 1 and 20 molar equivalents relative to the neodymium of a co-catalyst consisting of a "BuLi/DiBAH" mixture with neodymium/BuLi/DiBAH=1/10/10, then 25 ml of butadiene and finally a quantity of ethylene so as to obtain a total pressure in the reactor of P=4.5 bar when the temperature T was 80° C. were introduced in succession into a reactor under an argon atmosphere. The internal pressure of the reactor was then maintained at 4.5 bar.

After a reaction time of 3.5 h, polymerization was terminated by cooling and degassing the reactor, then the terpolymer was obtained by precipitation in methanol. After drying at reduced pressure at 70° C., the yield was 25.7 g. The molecular mass Mn of the terpolymer was 13300 g/mol (Ip index=2.9). The glass transition temperature was −78° C. Analysis of the terpolymer by $^{13}C$ and $^{1}H$ NMR was as follows (molar contents):
  octene=14.4%, ethylene=28.8% and butadiene=56.8%, with
  1,2-butadiene=5.7% and 1,4-butadiene=94.3%, 99.3% of which was trans-1,4.

COMPARATIVE EXAMPLES 10

Copolymerization of Butadiene/Hexene and Terpolymerization of Ethylene/Butadiene/Hexene by Means of a Known Organometallic Complex and a Co-catalyst The catalytic system used is one of those described in the above-stated patent specification EP-A-1 092 731 as being usable for the copolymerization of ethylene and butadiene.

This catalytic system comprises an organometallic complex of the formula [Me$_2$Si(Me$_3$SiC$_5$H$_3$)$_2$]NdCl, where Me denotes a methyl group, and a BuLi/DiBAH co-catalyst.

It will be noted that this organometallic complex comprises two substituted cyclopentadienyl groups, unlike the organometallic complex according to the invention which specifically comprises one cyclopentadienyl group and one fluorenyl group.

EXAMPLE 10-1

Copolymerization of Butadiene/Hexene

A solution composed of 10 ml of toluene, 100 ml of hexene, 42.3 mg of this known complex of the formula [Me$_2$Si (Me$_3$SiC$_5$H$_3$)$_2$]NdCl and 20 molar equivalents relative to the neodymium of the co-catalyst consisting of a "BuLi/DiBAH" mixture, with neodymium/BuLi/DiBAH=1/10/10, then 30 ml of butadiene were introduced in succession into a reactor under an argon atmosphere. The temperature of the polymerization reactor was adjusted to 80° C.

After a reaction time of 28 h, polymerization was terminated by cooling and degassing the reactor, then the copolymer was obtained by precipitation in methanol. After drying at reduced pressure at 70° C., the yield was 5.0 g. The molecular mass Mn of the copolymer was 5900 g/mol (Ip=2.5). Analysis of the copolymer by $^{13}C$ and $^{1}H$ NMR was as follows (molar contents):
  hexene=11.6% and butadiene=88.4%, with:
  1,2-butadiene=5.3% and 1,4-butadiene=94.7%, 94.5% of which was trans-1,4.

It will be noted that the butadiene/hexene copolymer obtained in Example 4 according to the invention (copolymerization with the organometallic complex according to Example 1) had a much higher molar content of units resulting from hexene (29.8% compared with only 11.6% in this Example 10-1), and that the copolymerization yield relating to this Example 4 (18.9 g) was very much higher than that of this comparative Example 10-1.

EXAMPLE 10-2

Terpolymerization of Ethylene/Butadiene/Hexene

A solution composed of 10 ml of toluene, 100 ml of hexene, 33 mg of this known complex of the formula [Me$_2$Si (Me$_3$SiC$_5$H$_3$)$_2$]NdCl and 20 molar equivalents relative to the neodymium of co-catalyst consisting of a "BuLi/DiBAH" mixture with neodymium/BuLi/DiBAH=1/10/10, then a quantity of a butadiene/ethylene mixture (containing 20 mol % of butadiene), so as to obtain a total pressure in the reactor of P=4 bar when the temperature T was 80° C. were introduced in succession into the reactor under an argon atmosphere. The internal pressure of the reactor was then maintained at 4 bar.

After a reaction time of 2 h, polymerization was terminated by cooling and degassing the reactor, then the terpolymer was obtained by precipitation in methanol. After drying at reduced pressure at 70° C., the yield was 6.4 g. The molecular mass Mn of the terpolymer was 2600 g/mol (Ip=1.5). Analysis of the terpolymer by $^{13}C$ and $^{1}H$ NMR was as follows (molar contents):
  hexene=0.8%, ethylene=76.0% and butadiene=23.2%, with
  1,2-butadiene=1.4% and 1,4-butadiene=98.6%, 100.0% of which was trans-1,4.

It will be noted that the molar content of units resulting from hexene is extremely low, being less than 1%.

COMPARATIVE EXAMPLE 11

Copolymerization of Butadiene/Hexene by Means of Another Known Organometallic Complex and a Co-catalyst The catalytic system used here was one of those described in the above-stated patent specification EP-A-1 092 731 as being usable for the copolymerization of ethylene and butadiene.

This catalytic system comprises an organometallic complex of the formula [Me$_2$Si(C$_{13}$H$_8$)$_2$]NdCl, where Me denotes a methyl group, and a BuLi/DiBAH co-catalyst.

It will be noted that this organometallic complex comprises two fluorenyl groups, unlike the organometallic complex according to the invention.

A solution composed of 10 ml of toluene, 100 ml of hexene, 28 mg of this known complex of the formula [Me$_2$Si(C$_{13}$H$_8$)$_2$]NdCl and 20 molar equivalents relative to the neodymium of the co-catalyst consisting of a "BuLi/DiBAH" mixture, with neodymium/BuLi/DiBAH=1/10/10, then 25 ml of butadiene were introduced in succession into a reactor under an argon atmosphere. The temperature of the polymerization reactor was adjusted to 80° C.

After a reaction time of 18 h, polymerization was terminated by cooling and degassing the reactor, then the copolymer was obtained by precipitation in methanol. After drying at reduced pressure at 70° C., the yield was 0.5 g. Two fractions of copolymer were obtained (very low yield), one of low molecular mass Mn (1830 g/mol, Ip=1.3) and the other of high molecular mass (91160 g/mol, Ip=1.75). Analysis of the copolymer by $^{13}$C and $^1$H NMR was as follows (molar contents):

hexene=1.8% and butadiene=98.2%, with:
1,2-butadiene=12.8% and 1,4-butadiene=87.2%, 68.6% of which was trans-1,4.

It will be noted that the butadiene/hexene copolymer obtained in Example 4 according to the invention (copolymerization with the organometallic complex according to Example 1) had a much higher molar content of units resulting from hexene (29.8% compared with only 1.8% in this Example 11), and that the copolymerization yield relating to this Example 4 (18.9 g) was very much higher than that of this comparative Example 11.

APPENDIX $^{13}$C NMR and $^1$H NMR Analyses of the α-Olefin and Butadiene Copolymers The instrument used for these analyses was a Bruker DRX 400 spectrometer operating at a frequency of 400 MHz for the proton and 100.6 MHz for the carbon. The analysis solvent was a mixture of deuterated tetrachloroethylene (TCE) and benzene (C$_6$D$_6$). The spectra were recorded at a temperature of 90° C.

1) Analysis of a Copolymer by $^1$H NMR

Analysis of a $^1$H NMR spectrum of an α-olefin and butadiene copolymer makes it possible to reveal the composition of the copolymer (content of butadiene and α-olefin) and the ratio between 1,2 and 1,4 insertion of the butadiene without distinguishing between 1,4-trans and 1,4-cis insertions.

The spectra were divided into 5 zones (S$_0$-S$_4$) corresponding to characteristic lines of the various protons belonging to the α-olefin (designated Ol), to the butadiene inserted as 1,2 (V) or as 1,4 (L) (see Table 1).

Integration of the different regions defined in Table 1 enabled us very rapidly to discover the total quantity of butadiene (B=L+V) and the 1,2/1,4 ratio:

$S_3 = 2V$ i.e. $V = S_3/2$ $S_4 = 2L + V$ i.e. $L = (S_4 - S_3)/2$ and therefore:

$B = S_3/4 + S_4/2$ (total quantity of butadiene)

$V/(V+L) = (S_3/2)/(S_3/4 + S_4/2)$ (butadiene content inserted as 1,2)

Two spectra relating respectively to hexene-butadiene and hexadecene-butadiene copolymers were obtained by $^1$H NMR, each of the these two copolymers having been synthesized by means of the organometallic complex of the formula [Me$_2$Si(C$_5$H$_4$)(C$_{13}$H$_8$)]NdCl(OC$_4$H$_8$)$_x$ prepared in Example 1 and a co-catalyst consisting of a "BuLi/DiBAH" mixture, with neodymium/BuLi/DiBAH=1/10/10. Table 1 below provides details of the assignment of the lines on these spectra.

TABLE 1

| zones (δ (ppm)) (number of protons) | assignment |
|---|---|
| S$_0$ (0.5-1 ppm) 3H (Ol) | 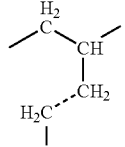 |
| S$_1$ (1-1.65 ppm) (2n-3)H (Ol) + 2H (V) | 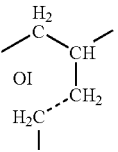 |
| S$_2$ (1.65-2.65 ppm) 4H (L) + 1H (V) | 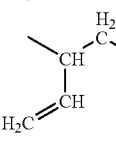 |
| S$_3$ (4.65-5.06 ppm) 2H (V) | 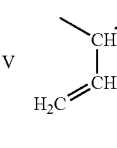 |
| S$_4$ (5.06-6.4 ppm) 2H (L) + 1H (V) | 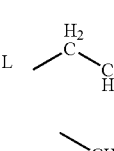 |

In order to obtain the total quantity of α-olefin in the copolymer, it is theoretically sufficient to use one of the two zones S$_0$ or S$_1$ but various situations may arise.

First of all, when the molar masses of the copolymers are low, the characteristic lines of saturated (butyl, octyl or isobutyl) chain ends are found in the S$_0$-S$_1$ zone, which means that this zone is no longer characteristic of the α-olefin insertion rate. In this case, the rate will have to be determined on the basis of $^{13}$C NMR of the copolymer.

In the case of long olefins or when the α-olefin content is not very high, the S$_0$ line is too weak to be used directly for determining the α-olefin content and the $S_1$ line or the two lines $(S_0+S_1)$ should be used instead.

Finally, in some cases, resolution of the $S_0$, $S_1$ and $S_2$ surface areas is poor, so preventing them from being integrated separately and therefore the α-olefin insertion rate will be determined on the basis of the sum total of these surface areas.

A distinction must accordingly be drawn between various scenarios. Each calculation is adjusted to some of the above-described circumstances and the results obtained may be confirmed with the different methods:

$1^{st}$ case: use of $S_0$ alone (relatively high molar masses)
$S_0=3Ol$ and therefore:

$Ol=S_0/3$ (quantity of α-olefin)

$2^{nd}$ case: use of $S_1$ alone (in the case of long olefins)

$S_1=(2n-3)Ol+2V=(2n-3)Ol+S_3$ (n number of carbons of the α-olefin)

$Ol=(S_1-S_3)/(2n-3)$ (quantity of α-olefin)

$3^{rd}$ case: use of $(S_0+S_1)$ because $S_0$ is not reliable (low α-olefin content or long olefins) or $S_0$ and $S_1$ are poorly resolved.

$(S_0+S_1)=3Ol+(2n-3)Ol+S_3=2nOl+S_3$ $Ol=(S_0+S_1)-S_3)/2n$ (quantity of α-olefin)

$4^{th}$ case: use of $(S_1+S_2)$ because $S_1$ and $S_2$ are poorly resolved $(S_1+S_2)=(2n-3)Ol+S_3+2S_4-S_3/2=(2n-3)Ol+2S_4+S_3/2$ $Ol=(S_1+S_2)-2S_4-S_3/2)/(2n-3)$ (quantity of α-olefin)

$5^{th}$ case: use of $(S_0+S_1+S_2)$ $(S_0+S_1+S_2)=2nOl+S_3/2+2S_4$ $Ol=((S_0+S_1+S_2)-S_3/2-2S_4)/2n$ (quantity of α-olefin)

Copolymer composition may readily be deduced on the basis of the quantities of butadiene and α-olefin calculated above.

2) Analysis of a Copolymer by $^{13}$C NMR:

Analysis of the $^{13}$C NMR spectra of the copolymers makes it possible to identify the copolymer's microstructure more precisely. On the basis of this microstructural analysis by NMR (i.e. quantification of the various linkage sequences of the "monomeric" units, namely butadiene diads or triads, specifically 1,2/1,4-cis butadienes and 1,4-trans- and α-olefin), it is possible to reveal the composition of the copolymer and the cis/trans ratio of 1,4 insertion of the butadiene. This analysis is specific to each α-olefin.

We have decided to provide a detailed description of the analysis of the $^{13}$C NMR spectrum of a hexene-butadiene copolymer by presenting the overall method for assigning the different lines of the spectrum and then quantifying the composition of the copolymer. For all the other α-olefins, the presentation will be briefer, but the procedure used is identical to that for hexene.

We were also content merely to analyse the aliphatic carbon zone (high field) without paying attention to the alkene carbon zone (low field) because the latter provides no additional information.

All the copolymers investigated in this section have relatively high molar masses which makes it possible to avoid having a $^{13}$C NMR spectrum which is disrupted by the peaks corresponding to the chain ends.

2.1) Hexene-Butadiene Copolymer:

$^{13}$C NMR was used to obtain the spectrum of a hexene-butadiene copolymer synthesized by means of the organometallic complex of the formula $[Me_2Si(C_5H_4)(C_{13}H_8)]NdCl(OC_4H_8)_x$ prepared in Example 1 and a co-catalyst consisting of a "BuLi/DiBAH" mixture, with neodymium/BuLi/DiBAH=1/10/10.

The characteristic lines of a $(CH_2)$ carbon are immediately evident at 27.83 (line 4) and 33.10 ppm (line 8) in a position of a butadiene double bond inserted respectively in 1,4-cis and 1,4-trans position in a butadiene-butadiene linkage (as in a polybutadiene). The characteristic lines of a butadiene inserted in 1,2 position in a polybutadiene are also present in a low content at 34.5 and 38.4 ppm.

On the other hand, the characteristic signals of hexene-hexene linkages are absent (no line at 41.17 ppm $(CH_2)$, which is characteristic of an HH linkage in a polyhexene).

The other unidentified signals must therefore correspond to hexene-butadiene (HB) linkages in which the hexene is isolated (BHB). Analysis of the ethylene-butadiene copolymers obtained with this catalyst thus demonstrates that the butadiene was essentially inserted in 1,4-trans position. We could thus expect to tend to find this type of insertion in the copolymers of butadiene and α-olefins.

We thus sought out the characteristic lines of a 1,4-trans butadiene/hexene/1,4-trans butadiene (THT) linkage. To this end, we used as the starting point the chemical shifts of an EHE linkage of a hexene-ethylene copolymer to which we applied the increments due to the influence of a trans double bond (T) which were determined in the laboratory for the ethylene-butadiene copolymers:

(α(trans)=+2.84; β(trans)=0; γ(trans)=−0.5; δ(trans)=−0.15 and ε-trans)=−0.04 ppm).

This procedure is illustrated by scheme A and Table 2 below. It made it possible to identify eight new signals (lines 1, 2, 5, 6, 9-12 of the spectrum) which are characteristic of the THT linkage (Table 2).

Scheme A: Change from an EHE linkage to a THT linkage (annotation used).

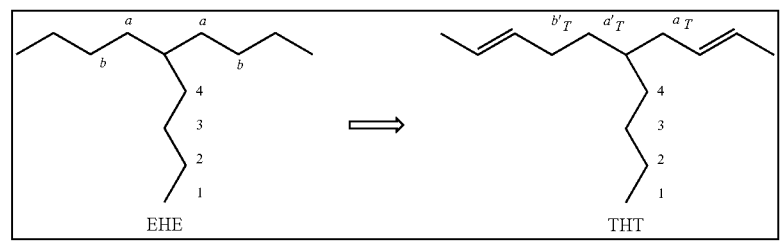

TABLE 2

Calculated and observed chemical shifts of the characteristic lines of a THT linkage.

| carbon | δ (EHE) exp. | increment | δ (THT) calculated | δ (THT) observed | Δδ |
|---|---|---|---|---|---|
| $a_T$ | 34.48 (a) | α + δ | 37.17 | 37.25 | +0.08 |
| $a'_T$ | 34.48 (a) | β + γ | 33.98 | 34.20 | +0.22 |
| $b'_T$ | 27.30 (b) | α + δ | 29.99 | 30.32 | +0.33 |
| CH | 38.11 (CH) | β + γ | 37.61 | 37.89 | +0.28 |
| 1 | 14.16 (1) | — | 14.16 | 14.11 | −0.05 |
| 2 | 23.46 (2) | ε | 23.42 | 23.33 | −0.09 |
| 3 | 29.54 (3) | δ + ε | 29.35 | 29.41 | +0.06 |
| 4 | 34.09 (4) | δ + γ | 33.44 | 33.61 | +0.21 |

All the main signals of the spectrum of the hexene-butadiene copolymer have thus been assigned. Two other less intense lines (lines 3 and 7) have also been identified as being specific to a BHB linkage in which the butadiene is inserted in 1,4-cis (C).

In this case, only carbons a or b' are affected by a change in the manner of insertion of the butadiene, the others have identical shifts whether the double bond is cis or trans. It is in fact commonly accepted that the increments due to the influence of a cis and trans double bond are identical except for the carbon in α position of the latter.

The chemical shifts of the carbons adjacent to a cis double bond (C) were obtained on the basis of those determined for THT by deducting the observed difference between a $CH_2$ in α position of a cis and trans double bond in a polybutadiene (Δδ=5.15 ppm).

Table 3 below shows all the chemical shifts for the carbons of a hexene-butadiene copolymer (on the basis of the spectrum).

TABLE 3

Chemical shifts of the carbons of a hexene-butadiene copolymer: (see scheme A above for annotation)

| line no. | type of carbon | diads affected | δ ppm |
|---|---|---|---|
| 12 | CH(H) | (T or C)H̲ | 37.89 |
| 11 | $a_T$ | HT̲ | 37.25 |
| 10 | $a'_C + a'_T$ | (T or C)H̲ | 34.20 |
| 9 | H4 | — | 33.61 |
| 8 | $α_T$ | 2T̲(T or C) | 33.10 |
| 7 | $a_C$ | HC̲ | 32.12 |
| 6 | $b'_T$ | T̲H | 30.32 |
| 5 | H3 | — | 29.41 |
| 4 | $α_C$ | 2C̲(T or C) | 27.83 |
| 3 | $b'_C$ | C̲H | 25.11 |
| 2 | H2 | — | 23.33 |
| 1 | H1 | — | 14.11 |

The hexene units were quantified by using carbons H3 (line 5), H4 (line 9) or a' (line 10), the integrals of which are more reliable than the others (H1, H2: not completely relaxed because at end of branching; different CH:NOE . . . ).

and therefore:

$H = A_5 = A_9 = A_{10}$ (or the mean of the three)

For butadiene, a distinction must be drawn between 1,4-cis (C) and 1,4-trans (T) insertions.

Taking account of all the carbons in α position of the double bonds results in:

$2T = 2\ T(C\ or\ T) + TH = 2\ T(C\ or\ T) + \overrightarrow{TH} + \overrightarrow{HT}$ (carbons in α position of T in the butadiene-butadiene and butadiene-hexene diads), $2C = 2\ C(C\ or\ T) + CH = 2\ C(C\ or\ T) + \overrightarrow{CH} + \overrightarrow{HC}$ (carbons in α position of C).

After assignment of the lines (see table 3 above), this results in:

$2T(C\ or\ T) = A_8,\ \overrightarrow{TH} + \overrightarrow{HT} = "b'_T + a_T" = A_6 + A_{11}$ $2\ C(C\ or\ T) = A_4,\ \overrightarrow{CH} + \overrightarrow{HC} = "b'_C + a_C" = A_3 + A_7$ and therefore, $2T = A_8 + A_6 + A_{11}$ and $2C = A_4 + A_3 + A_7$ and $2(T+C) = 2L = A_3 + A_4 + A_6 + A_7 + A_8 + A_{11}$ We can therefore determine the rate of insertion of hexene in the copolymer together with the stereochemical properties of butadiene insertion:

hexene content:

$H/(H+L) = 2A_{10}/(2A_{10} + A_3 + A_4 + A_6 + A_7 + A_8 + A_{11})$ (L=1,4 butadiene) which must be corrected by taking account of the rate of r insertion of the butadiene in 1,2 position determined from the $^1$H NMR and which becomes:

$H/(H+B) = 2A_{10}/(2A_{10} + (1/(1-\tau))(A_3 + A_4 + A_6 + A_7 + A_8 + A_{11}))$ $(= H/(H+L+V) = H/(H+(1/(1-\tau))L))$ 1,4 insertion of butadiene:

cis/cis+trans ratio in the copolymer $= (A_4 + A_3 + A_7)/(A_3 + A_4 + A_6 + A_7 + A_8 + A_{11})$ cis/cis+trans ratio in the butadiene-butadiene diads $= A_4/(A_4 + A_8)$ cis/cis+trans ration in the butadiene-hexene diads $= (A_3 + A_7)/(A_3 + A_6 + A_7 + A_{11})$

2.2) Propylene-Butadiene Copolymer:

$^{13}$C NMR was used to obtain the spectrum of a propylene-butadiene copolymer synthesized by means of the organometallic complex of the formula $[Me_2Si(C_5H_4)(C_{13}H_8)]NdCl$ $(OC_4H_8)_x$ prepared in Example 1 and a co-catalyst consisting of a "BuLi/DiBAH" mixture, with neodymium/BuLi/DiBAH=1/10/10.

We used the same procedure as above to assign the different lines (see Table 4 below). No propylene unit linkage was observed, the propylene units always being isolated between two butadiene units.

The annotation is shown in scheme B below.

TABLE 4

| line no. | type of carbon | δ ppm | diads affected |
|---|---|---|---|
| 7 | $a_T$ | 40.29 | PT̲ |
| 6 | $a'_C + a'_T$ | 36.95 | (T or C)P̲ |
| absent | $a_C$ | 35.07 | PC̲ |
| 5 | $α_T$ | 33.06 | 2T̲(T or C) |
|  | methine (P) | 33.00 | (T̲ or C)P̲(T or C) |
| 4 | $b'_T$ | 30.45 | T̲P |
| 3 | $α_C$ | 27.80 | 2C̲(T or C) |
| 2 | $b'_C$ | 25.23 | C̲P |
| 1 | P1 | 19.57 | — |

Scheme B: Annotation for a BPB linkage of a propylene-butadiene copolymer.

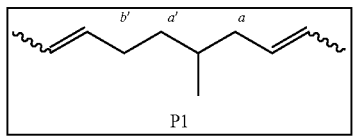

P1

On the basis of these assignments, we determined the composition and the microstructure of the copolymer:

$P = A_6$, $2T = 2\ T(C\ or\ T) + TP$ and $2C = 2\ C(C\ or\ T) + CP$ (TP and CP are non-oriented diads), i.e. $2(T+C) = 2\ T(C\ or\ T) + 2\ C(C\ or\ T) + (TP+CP) = (A_5 - A_6) + A_3 + 2A_6$ and therefore, the content of propylene is:

$P/(P+L) = 2A_6/(A_3+A_5+3A_6)$ (L=1,4 butadiene) which must be corrected by taking account of the rate of τ insertion of the butadiene in 1,2 position determined from the $^1$H NMR and which becomes:

$P/(P+B) = 2A_6/(2A_6+(1/(1-\tau))(A_3+A_5+A_6))$

With regard to butadiene insertion, it is easy to determine:

cis/cis+trans ratio in the butadiene-butadiene diads
$= A_3/(A_3+A_5+A)$ cis/cis+trans ration in the butadiene-propylene diads
$= A_2)/(A_2+A_4)$ 2.3) Butene-Butadiene Copolymer:

$^{13}$C NMR was used to obtain the spectrum of a butene-butadiene copolymer synthesized by means of the organometallic complex of the formula $[Me_2Si(C_5H_4)(C_{13}H_8)]NdCl(OC_4H_8)_x$ prepared in Example 1 and a co-catalyst consisting of a "BuLi/DiBAH" mixture, with neodymium/BuLi/DiBAH=1/10/10.

Assignment of the lines of this spectrum is described in Table 5 below. The butene is practically always isolated between two butadiene units inserted in 1,4-trans position (TBT). The annotation used is identical to that used for the propylene with the exception of carbons B1 and B2 which correspond to the lateral alkyl group.

TABLE 5

| line no. | type of carbon | δ ppm | diads affected |
|---|---|---|---|
| 9 | methine (B) | 39.45 | (T or C)B(T or C) |
| 8 | $a_T$ | 36.76 | BT |
| 7 | $a'_C + a'_T$ | 33.64 | (T or C)B |
| 6 | $\alpha_T$ | 32.96 | 2T(T or C) |
| absent | $a_C$ | 31.54 | BC |
| 5 | $b'_T$ | 30.31 | TB |
| 4 | ? (not assigned) | 29.46 | ? |
| 3 | $\alpha_C$ | 27.81 | 2C(T or C) |
| 2 | B2 | 26.27 | — |
| virtually absent | $b'_C$ | 25.11 | CB |
| 1 | B1 | 11.09 | — |

On the basis of these assignments, we determined the composition and the microstructure of the copolymer:

$B = A_5 = A_7 = A_8$ (or the mean of the three)

$2T = 2\ T(C\ or\ T) + TB = A_6 + A_5 + A_8$ and $2C = 2\ C(C\ or\ T) + CB = A_3$ i.e. $2(T+C) = A_3 + A_6 + A_5 + A_8$ and therefore, the content of butene is:

$B/(B+L) = 2A_7/(2A_7+A_3+A_6+A_5+A_8)$ (L=1,4 butadiene) which must be corrected by taking account of the rate of c insertion of the butadiene in 1,2 position determined by $^1$H NMR and which becomes:

$B/(B+Bu) = 2A_7/(2A_7+(1/(1-\tau))(A_3+A_6+A_5+A_8))$

With regard to butadiene insertion, the following is found:

cis/cis+trans ratio in the butadiene-butadiene diads$= A_3/(A_3+A_6)$ no 1,4-cis in the butadiene-butene diads 2.4) Octene-Butadiene Copolymer:

$^{13}$C NMR was used to obtain the spectrum of an octene-butadiene copolymer synthesized by means of said organometallic complex of the formula $[Me_2Si(C_5H_4)(C_{13}H_8)]NdCl(OC_4H_8)_x$ prepared in Example 1 and a co-catalyst consisting of a "BuLi/DiBAH" mixture, with neodymium/BuLi/DiBAH=1/10/10.

Assignment of the lines of this spectrum is described in table 6 below. The octene is always isolated between two butadiene units inserted in 1,4-trans position (TOT). Scheme C below shows the annotation used.

Scheme C: annotation for a TOT linkage of an octene-butadiene copolymer:

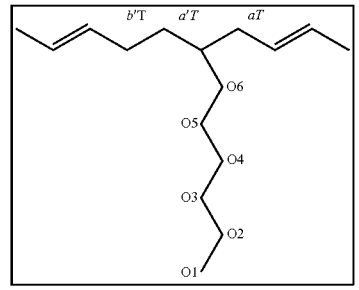

TABLE 6

| line no. | type of carbon | δ ppm | diads affected |
|---|---|---|---|
| 8 | Methine (O) | 37.97 | (T or C)O |
| 7 | $a_T$ | 37.26 | OT |
| 6 | $a'_C + a'_T$ | 34.20 | (T or C)O |
| 5 | O6 | 34.00 | — |
| 4 | $\alpha_T$ | 33.03 | 2T(T or C) |
| — | O3 | 32.30 | — |
| absent | $a_C$ | 32.13 | OC |
| — | O4 | 30.40 | — |
| 3 | $b'_T$ | 30.04 | TO |
| 2 | $\alpha_C$ | 27.83 | 2C(T or C) |
| 1 | O5 | 27.13 | — |
| absent | $b'_C$ | 24.79 | CO |
| — | O2 | 22.94 | — |
| — | O1 | 14.09 | — |

The composition and microstructure of the polymer is determined on the basis of these assignments:

$2O = A_1 + A_5$ $2T = 2\ T(C\ or\ T) + TO = A_4 + A_3 + A_7$ and $2C = 2\ C(C\ or\ T) + CO = A_2$ i.e. $2(T+C) = A_2 + A_4 + A_3 + A_7$ and therefore, the octene content is:

$O/(O+L)=(A_1+A_5)/((A_1+A_5)+A_2+A_4+A_3+A_7)$ (L=1,4 butadiene) which is corrected by taking account of the rate of τ insertion of the butadiene in 1,2 position determined by $^1$H NMR and which becomes:

$O/(O+B)=(A_1+A_5)/((A_1+A_5)+(1/(1-\tau)(A_2+A_4+A_3+A_7))$

With regard to butadiene insertion, the following is found:

cis/cis+trans ratio in the butadiene-butadiene diads=$A_2/(A_2+A_4)$ no 1,4-cis in the butadiene-hexadecene diads 2.5) Hexadecene-Butadiene Copolymer:

$^{13}$C NMR was used to obtain the spectrum of a hexadecene-butadiene copolymer synthesized by means of said organometallic complex of the formula [Me$_2$Si(C$_5$H$_4$)(C$_{13}$H$_8$)]NdCl(OC$_4$H$_8$)$_x$ prepared in Example 1 and a co-catalyst consisting of a "BuLi/DiBAH" mixture, with neodymium/BuLi/DiBAH=1/10/10.

Assignment of the lines of this spectrum is described in table 7 below.

TABLE 7

| line no. | type of carbon | δ ppm | diads affected |
|---|---|---|---|
| 8 | Methine (H) | 38.00 | (T or C)H |
| 7 | a$_T$ | 37.26 | H<u>T</u> |
| 6 | a'$_C$ + a'$_T$ | 34.20 | (T or C)H |
| 5 | H14 | 34.02 | |
| 4 | α$_T$ | 33.03 | 2<u>T</u>(T or C) |
| — | H3 | 32.25 | |
| virtually absent | a$_C$ | 32.13 | H<u>C</u> |
| 3 | H12 | 30.44-30.34 | — |
| | H5-H11 | 30.04 | |
| | b'$_T$ | 29.98 | T<u>H</u> |
| | H4 | 29.65 | — |
| 2 | α$_C$ | 27.83 | 2<u>C</u>(T or C) |
| 1 | H13 | 27.20 | — |
| absent | b'$_C$ | 24.79 | C<u>H</u> |
| — | H2 | 22.94 | |
| — | H1 | 14.09 | |

As with octene, the hexadecene is always isolated between two butadiene units inserted in 1,4-trans position (THT). On the basis of the various assignments, it may be concluded:

$2H=A_1+A_5$ $2T=2\ T(C\ or\ T)+TH=A_4+2A_6$ and $2C=2\ C(C\ or\ T)+CH=A_2$ i.e. $2(T+C)=A_2+A_4+2A_6$ and therefore, the hexadecene content is:

$H/(H+L)=(A_1+A_5)/((A_1+A_5)+A_2+A_4+2A_6)$ (L=1,4 butadiene) which must be corrected by taking account of the rate of X insertion of the butadiene in 1,2 position determined by $^1$H NMR and which becomes:

$H/(H+B)=(A_1+A_5)/((A_1+A_5)+(1/(1-\tau)(A_2+A_4+2A_6))$

With regard to butadiene insertion, the following is found:

cis/cis+trans ratio in the butadiene-butadiene diads=$A_2/(A_2+A_4)$ no 1,4-cis in the butadiene-hexadecene diads

The invention claimed is:

1. A copolymer of at least one conjugated diene and at least one alpha-olefin having from 3 to 18 carbon atoms, wherein said copolymer fulfils the following conditions:
   the number-average molecular mass of said copolymer is greater than 60,000 g/mol,
   said copolymer comprises units resulting from said conjugated diene(s) in a molar content of greater than 40% and less than or equal to 90%, and units resulting from said alpha-olefin(s) in a molar content of less than 60% and greater than or equal to 10%,
   said units resulting from said conjugated diene(s) have a trans-1,4 linkage content of greater than 70%,
   said copolymer is devoid of cyclic units, and
   said copolymer is such that each unit resulting from said alpha-olefin(s) is inserted in the chain of said copolymer between two units resulting from said or each conjugated diene.

2. The copolymer according to claim 1, which comprises units resulting from said conjugated diene(s) in a molar content of greater than 60% and less than or equal to 80%, and units resulting from said alpha-olefin(s) in a molar content of less than 40% and greater than or equal to 20%.

3. The copolymer according to claim 1, which consists of a copolymer of a conjugated diene and an alpha-olefin having from 3 to 18 carbon atoms.

4. The copolymer according to claim 1, which consists of a terpolymer of a conjugated diene, ethylene and an alpha-olefin having from 3 to 18 carbon atoms.

* * * * *